Figure 1:
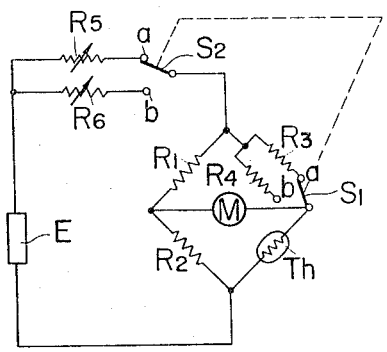

Jan. 10, 1967 ZENMON ABE ETAL 3,296,866
ELECTRIC THERMOMETER
Filed Jan. 29, 1964 2 Sheets-Sheet 1

United States Patent Office 3,296,866
Patented Jan. 10, 1967

3,296,866
ELECTRIC THERMOMETER
Zenmon Abe and Takaji Suzuki, Tokyo, Japan, assignors to Hitachi, Ltd., Tokyo, Japan, a corporation of Japan
Filed Jan. 29, 1964, Ser. No. 341,025
Claims priority, application Japan, Feb. 4, 1963, 38/4,485; Mar. 18, 1963, 38/17,087; Mar. 25, 1963, 38/20,195
3 Claims. (Cl. 73—362)

This invention relates to an apparatus to measure the body-temperature of a human body, and in particular to an apparatus to measure the body-temperature electrically by using a temperature sensitive element such as a thermistor.

Though the heat time constant of a temperature sensitive element (for instance a thermistor) of an electric thermometer is very short in water such as 0.4 to 0.6 sec., it is usual to require the relatively long time, of about 3 minutes, to measure the body temperature at the armpit. One reason for this is that the temperature at the armpit is lowered nearly to the room temperature before the thermometer is put into the armpit, so that it requires a certain time until the temperature to be measured is raised up to the body temperature.

This measuring time may be shortened, if the subject preliminarily pushes his arm against his body to close the armpit in the same way as at the time of measurement so that the temperature at the armpit will be the same as the body temperature. Another reason for the long measuring time is as follows: The temperature-sensitive probe of an electric thermometer should be large for the ease of treatment, while, in order to keep the heat time constant smaller, it is desirable that the temperature sensor should be made as small as possible. Therefore, it is usual to make the supporter of an electric thermometer relatively large and the temperature sensitive probe relatively small. In this case, however, the contact between the skin and the temperature sensor is not perfect (or even if it is perfect, there is heat-resistance between the skin and the temperature sensor) and the air between the skin and the temperature sensor lowers the heat-conductivity therebetween so that the response time becomes long.

The main object of this invention is to make the response time at the measurement extremely short and at the same time to provide an accurate measurement, by keeping the temperature of the thermometer beforehand nearly at the body temperature of the subject.

A second object of this invention is to provide an automatic control to raise the temperature of the temperature sensor beforehand up to the desired temperature as above mentioned and to measure the body temperature rapidly and easily.

A third object of this invention is to measure the body temperature in a short time, by keeping both the heat dissipation of the temperature sensor and the power for the preheat to raise the temperature of the temperature sensor up to the desired temperature as low as possible.

Figure 2:
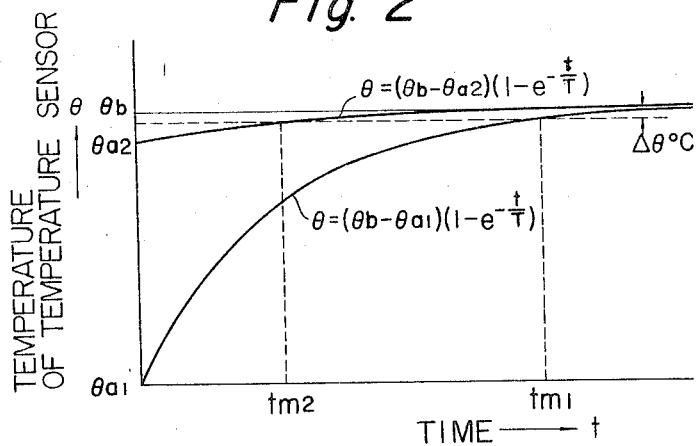
Figure 3:
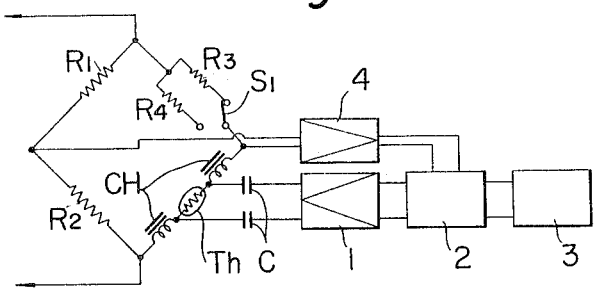
Figure 4:
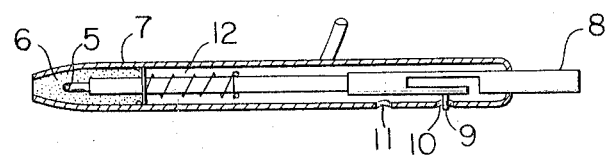
Figure 5:
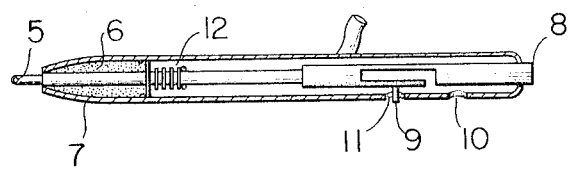
Figure 6:
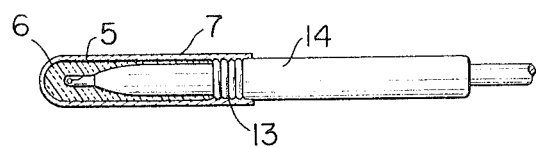

Other objects and advantages of the invention will become apparent by reference to the following detailed description when taken in conjunction with the accompanying illustrations, in which:

FIG. 1 and FIG. 3 are wiring diagrams showing an embodiment of a thermometer in accordance with this invention; FIG. 2 shows response curves for the known apparatus and for the apparatus of this invention, respectively; and FIG. 4 to FIG. 6 are cross sections showing the detailed structure of the temperature sensor of the thermometer in accordance with this invention.

Referring now in particular to the illustrations of the thermometer, there is shown in FIG. 1 a wiring diagram of an electric thermometer in accordance with this invention. Resistors $R_1$, $R_2$, $R_3$ and $R_4$, and a thermistor element $T_h$ form a bridge. Between the connecting point of the said resistors $R_1$ and $R_2$ and the connecting point of the thermistor $T_h$ and a switch $S_1$, there is connected an ammeter to measure the unbalance current of the bridge, while there is connected a power supply E through a switch $S_2$ and variable resistors $R_5$ and $R_6$ between the connecting point of the resistor $R_2$ and the thermistor element $T_h$ and the connecting point of resistors $R_1$, $R_3$ and $R_4$.

The resistance value of the said resistor $R_3$ is chosen so that it should be balanced in the bridge with the resistance value of the thermistor $T_h$ at the normal room temperature, while the resistance value of the resistor $R_4$ is chosen so that it should be balanced in the bridge with the resistance value of the thermistor at the temperature of the subject, for example, 37° C. In this way, at the time of measurement, the switches $S_1$ and $S_2$ are closed to the contact $b$ side and the variable resistor $R_6$ is adjusted so that the current through the ammeter M should become substantially null. In this case, a rather large current flows through the bridge so that the thermistor is heated by Joule heat of the current flowing through it and its resistance is changed. When the bridge reaches the balance point, the temperature of the said thermistor $T_h$ is nearly at 37° C. After that, the switches $S_1$ and $S_2$ are closed to the contact $a$ side, and at the same time, the temperature sensor consisting mainly of the thermistor $T_h$ should be touched to the place to be measured. Then, the temperature of the temperature sensor of the thermistor is altered in accordance with the temperature of the place to be measured, and the resistance value of the thermistor is also changed. As the current flowing through the ammeter M corresponds to the difference between the resistance value of the thermistor at the normal room temperature and that of the thermistor at the temperature of the place to be measured, the temperature of the thermistor temperature sensor in that state can be known by reading the scale of the ammeter M, which is marked in the terms of temperature. Further, the variable resistor $R_5$ is a resistor to correct the power supply voltage, when it varies.

FIG. 2 shows a response curve for the apparatus of this invention in comparison with that for a known one. When the body temperature is measured with the temperature sensitive probe of $\theta_a°$ C., its response is expressed approximately as follows:

$$\theta = (\theta_b - \theta_a)\left\{1 - \exp\left(-\frac{t}{T}\right)\right\} + \theta_a \qquad (1)$$

where $\theta$—temperature of the temperature sensor
$\theta_a$—temperature of the temperative sensor immediately before measurement
$\theta_b$—body temperature
T—maximum heat time constant of the measurement system
$t$—time While the accuracy of the measurement with an electric thermometer is defined as $\Delta\theta°$ C., the minimum measurement time is the time $t_m$ when the temperature $\theta°$ C. of the temperature sensor becomes equal to the difference between the body temperature $\theta_b°$ C. and the $\Delta\theta°$ C. $t_m$ is expressed from Eq. 1 as follows:

$$t_m = -T\ln\frac{\Delta\theta}{\theta_b - \theta_a} \qquad (2)$$

In FIG. 2, $t_{m1}$ is the time required for the temperature of the thermometer to be raised to $\theta_b - \Delta\theta$ when measured with a known thermometer, while $t_{m2}$ is that when measured with the apparatus in accordance with this invention As seen in FIG. 2, the smaller the value of $\theta_b - \theta_a$, the shorter is the measuring time. For example, when $\theta_b - \theta_a$ is equal to 1° C., the required measuring time is less than half that for the case when $\theta_b - \theta_a$ equals to 10° C. In the apparatus of this invention, the thermistor temperature sensor is preheated up to about 37° C. as mentioned above so the $\theta_b - \theta_a$ is about 1° C. and a rapid and accurate measurement is possible.

Now, in FIG. 3, there is shown an accurate and automatic control circuit to be used to pre-heat the temperature sensor of such an apparatus. In FIGURE 3, numeral 4 denotes an amplifier to amplify the unbalanced current in the bridge, numeral 2 denotes a modulator, numeral 3 denotes an oscillator and numeral 1 denotes an amplifier to amplify the output from the said modulator 2.

Before the measurement, the bridge has been adjusted to balance at the resistance value of the thermistor at the pre-heat temperature, so that before the temperature of the thermistor reaches the desired value, the unbalance current flows through the bridge and the current is amplified by the amplifier 4. The output from the oscillator 3 is applied to the modulator 2 and the output from the modulator is controlled by the output from the amplifier 4. The said output from the modulator 2 in accordance with the output from the amplifier 4 is amplified by the amplifier 1, applied to the thermistor $T_h$ and automatically controlled so that the unbalance voltage should become null. A capacitor C and a choke coil CH are impedance elements to prevent the interference between the power supply of the bridge and the amplifier 1. It is particularly convenient to make use of the automatic control circuit above mentioned so that the temperature of the temperature sensor can be controlled automatically. In this case, it is also possible to measure temperature from the unbalance current of a bridge by the same manipulation as that of the apparatus shown in FIG. 1, after the thermistor $T_h$ has automatically been pre-heated to a desired temperature.

In the following, the detailed structure of the temperature sensor in the electric thermometer will be explained. FIG. 4 and FIG. 5 show vertical cross sections of the temperature sensor. Numeral 5 denotes a temperature sensitive probe usually contained in a cap 7, which has an elastic heat insulating material 6, such as a non-rigid urethane foam, formed upon its interior surface. As the said heat insulating material, it is also possible to use other materials such as polystyrene rubber, foam rubber, glass wool, or the like. At the time of measurement, the push button is pushed so that a part of the said temperature sensitive probe penetrates through the heat insulating material and projects from the cap 7, as seen in FIG. 5. At the same time, another button 9 in the hole 10 is shifted to the position of hole 11. In order to return the temperature sensitive probe 5 into the cap 7 after the measurement, the said button should be pushed so that the probe goes back by virtue of the elasticity of a spring 12 around the probe, and the button 9 returns to the position of the hole 10.

By returning the temperature sensitive probe into the cap before the thermistor element is pre-heated, the heat dissipation is prevented by the heat insulating material so that little heating power is sufficient for the pre-heat and at the same time it is effective to shorten the measuring time.

FIG. 6 shows another detailed structure of the temperature sensor used in the electric thermometer of this invention. The temperature sensitive probe 5 is seated in the cap 7 which has the heat insulating material 6 on its inner surface, and the supporter 14 of the said probe 6 and the cap 7 are connected with a screw 13 so that they are removable from each other. In this case, too, the temperature sensitive probe is thermally insulated from the exterior and the heat dissipation is prevented.

What is claimed is:
1. An electric thermometer comprising a bridge circuit having a thermistor element in one arm, switch means in another arm of the bridge to change the impedance value therein between first and second values, a first amplifier for amplifying the unbalance current of said bridge, a generator for generating a definite alternating current signal, a modulator for modulating the output of said first amplifier with the output of said generator, a second amplifier for amplifying the output of said modulator, means to add the output of said second amplifier to both terminals of said thermistor, wherein the thermistor is heated by the unbalance current when the impedance value of said bridge arm has been set to the first value by said switch means, and the temperature of a human body is measured from the unbalance current when the said impedance value has been set to the second value by said switch means.

2. A thermometer as claimed in claim 1 wherein the first impedance value established by the switch means corresponds to the pre-heat temperature, and the second impedance value established by the switch means corresponds to room temperature.

3. A thermometer as claimed in claim 2 comprising variable resistance means coupled to the bridge for adjusting the null value of the bridge to the anticipated temperature of the subject with the switch means set to said first impedance value.

References Cited by the Examiner

UNITED STATES PATENTS

| | | | |
|---|---|---|---|
| 2,653,308 | 9/1955 | Allen | 73—362 X |
| 2,938,385 | 5/1960 | Mack et al. | 73—362 |
| 3,142,170 | 7/1964 | Calhoun | 73—362 X |
| 3,204,462 | 9/1965 | Horne | 73—359 |

LOUIS R. PRINCE, *Primary Examiner.*

D. McGIEHAN, H. B. SIEGEL, *Assistant Examiners.*